Dec. 8, 1936.    W. P. COX    2,063,586
BEARING CAGE
Filed Feb. 21, 1935    2 Sheets-Sheet 1

INVENTOR:
William P. Cox,
by Ian Van Gravely
HIS ATTORNEYS.

Dec. 8, 1936. W. P. COX 2,063,586
BEARING CAGE
Filed Feb. 21, 1935 2 Sheets-Sheet 2
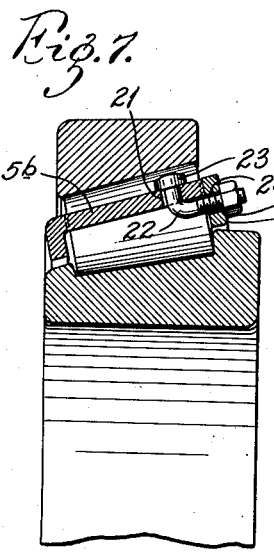
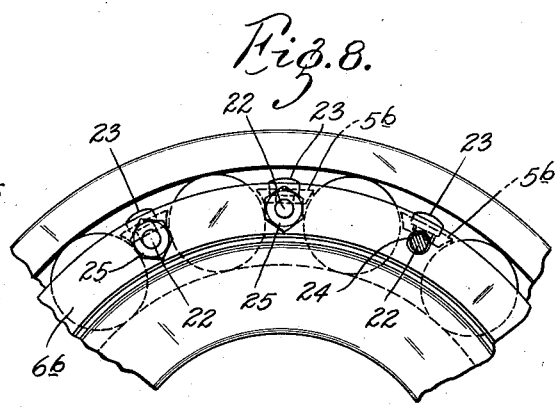
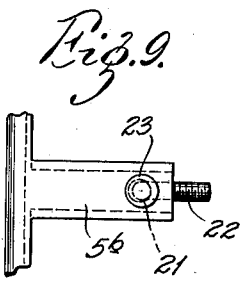
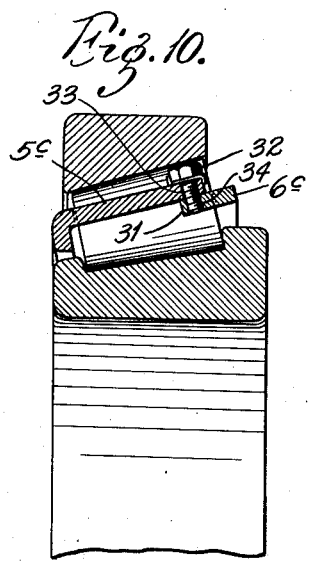
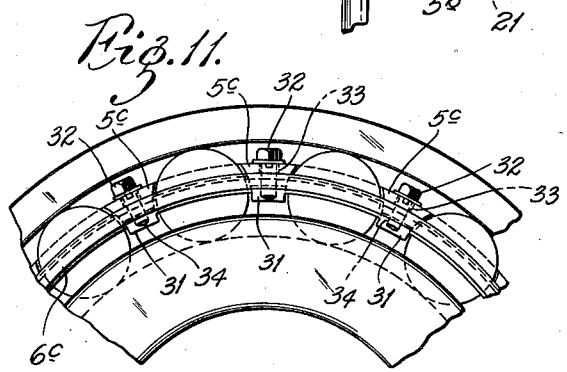
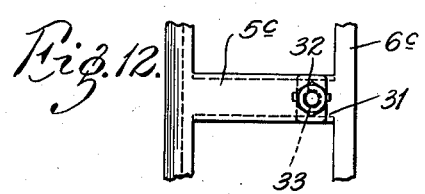
INVENTOR:
William P. Cox,
by Carl Ten Gravely,
HIS ATTORNEYS Patented Dec. 8, 1936

2,063,586

UNITED STATES PATENT OFFICE 2,063,586

BEARING CAGE

William P. Cox, Canton, Ohio, assignor to The Timken Roller Bearing Company, Canton, Ohio, a corporation of Ohio Application February 21, 1935, Serial No. 7,490

2 Claims. (Cl. 308—218)

My invention relates to cages for roller bearings, particularly to cages for heavy duty roller bearings such as bearings used in railway cars, rolling mills and other heavy machinery. The invention has for its principal object a cage which can be disassembled to permit removal of some or all of the rollers therefrom without damage to either cage or rollers.

The invention consists principally in the bearing cage having a separate large end ring removably secured to the bridges of the cage. The invention further consists in the bearing cage and in the parts and combinations of parts hereinafter described and claimed.

Figure 1:
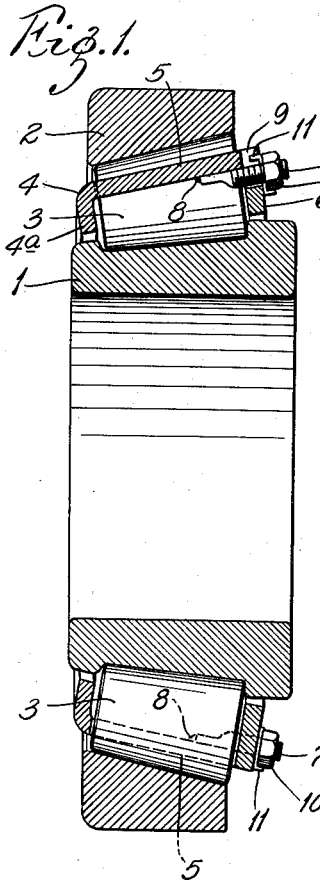
Figure 2:
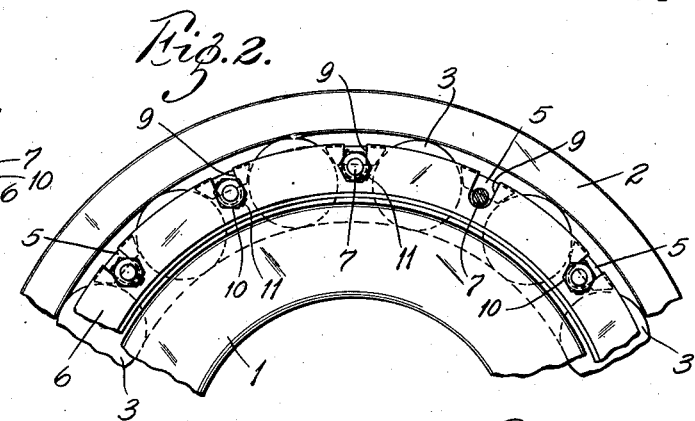
Figure 3:
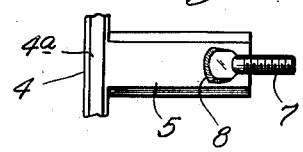
Figure 5:
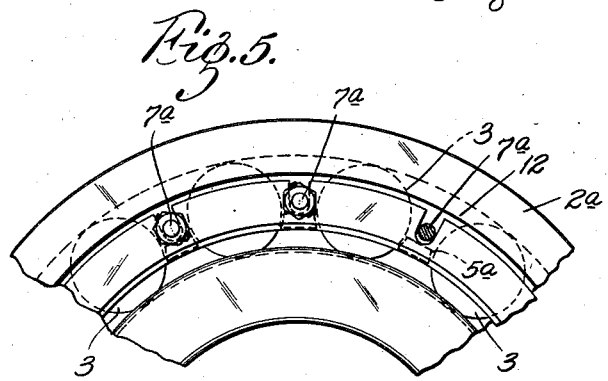
Figure 4:
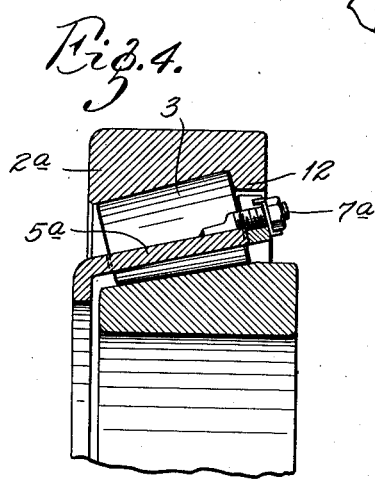
Figure 6:
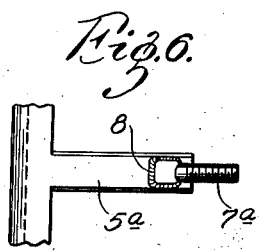

In the accompanying drawings, which form part of this specification and wherein like symbols refer to like parts wherever they occur, Fig. 1 is a longitudinal sectional view of a bearing having a cage embodying my invention, Fig. 2 is a partial end view, Fig. 3 is a detail view of one of the bridges of the cage, Figs. 4, 5 and 6 are views similar to Figs. 1, 2, and 3, respectively, showing a modified form of cage, Figs. 7, 8 and 9 are views similar to Figs. 1, 2, and 3, respectively, showing another modification; and Figs. 10, 11 and 12 are views similar to Figs. 1, 2 and 3 showing another modification.

In the drawings is illustrated a taper roller bearing including a cone 1 or inner bearing member, a cup 2 or outer bearing member, and conical rollers 3 therebetween, the rollers being held in a cage constituting the subject matter of this invention.

In the construction shown in Figs. 1, 2 and 3, the conical cage 4 has a flanged small end ring 4a and longitudinally extending bridges 5 projecting therefrom, said bridges forming the sides of the pockets for the rollers 3. At the large end of the cage a separate ring 6 is removably secured to the bridges.

As shown in Figs. 1, 2 and 3, threaded bolts 7 projecting longitudinally beyond the bridges 5 are secured to the inner faces of the several bridges, as by welding, indicated at 8. The separate end ring 6 has notches 9 extending radially inwardly from the outer periphery of the ring and receiving said bolts 7. Nuts 10 mounted on said bolts are drawn up against the separate end rings 6 to hold said end ring in position against the ends of the bridges 5. Suitable locking means 11 may be provided for holding the nuts 10 in position. Thus the cage and rollers are securely held in assembled position when the bearing is in use, but when it is desired to dismantle the bearing, the nuts 10 may be removed thus permitting the withdrawal of the loose end ring 6 and the removal of any rollers 3 that may need replacement.

The construction shown in Figs. 4, 5 and 6 is quite similar to that shown in Figs. 1, 2 and 3. In this modification the thrust rib 12 of the bearing is on the cup 2a or outer bearing member and the bridges 5a are disposed inwardly of the axial line of the rollers 3, thus holding the rollers in assembly with the cup. In this modification the bolt members 7a are secured to the outer faces of the bridges 5a.

In the modification shown in Figs. 7, 8 and 9, the bridges 5b are provided with holes 21 near their outer ends and angle bolts 22 of smaller size than said holes are mounted in said holes, the heads 23 of said bolts resting on the upper faces of the bridges 5b and the threaded ends thereof projecting beyond the ends of the bridges. The bolts 22 extend through holes 24 in the loose end ring 6b of larger diameter than the bolts and nuts 25 on the ends of said bolts hold the parts in assembled position.

In the construction shown in Figs. 10, 11 and 12, the large end ring 6c has fingers 31 projecting therefrom that lie flatwise against the inner faces of the end portions of the bridges 5c. Screws 32 extend through holes 33 in said bridges into threaded holes 34 in said fingers 31, thus holding the parts in assembled position.

The several forms of cage above described facilitate the assembling of the rollers of a large bearing and they permit removal of some or all of the rollers without injury to the rollers or to the cage itself, the same cage parts being used when the bearing is reassembled. Obviously, other means for securing the loose end ring to the bridges might be used and I do not wish to be limited to the precise construction shown.

Reference is hereby made to my copending applications Serial No. 75,043 filed April 18, 1936 and Serial No. 75,044 filed April 18, 1936, for subject matter shown but not claimed herein.

What I claim is:

1. A bearing cage comprising an end ring, bridges integral therewith, a separate end ring mounted at the other end of said bridges, said bridges having holes near their ends, angle bolts extending through said holes with their ends projecting longitudinally beyond said bridges, said large end ring having holes through which said bolts extend and nuts for said bolts.

2. A bearing cage comprising an end ring, bridges integral therewith, a separate end ring mounted at the other end of said bridges, said bridges having holes near their ends, angle bolts extending through said holes with their heads on the outer faces of said bridges and their ends projecting longitudinally beyond said bridges, said large end ring having holes through which said bolts extend and nuts for said bolts.

WILLIAM P. COX.